(No Model.)
A. W. BURDICK.
VEHICLE SPRING.
No. 533,344. Patented Jan. 29, 1895.
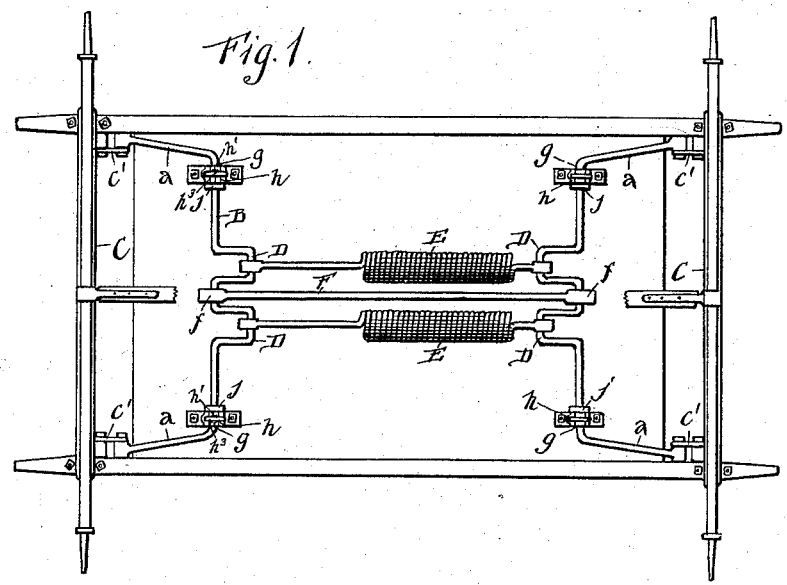
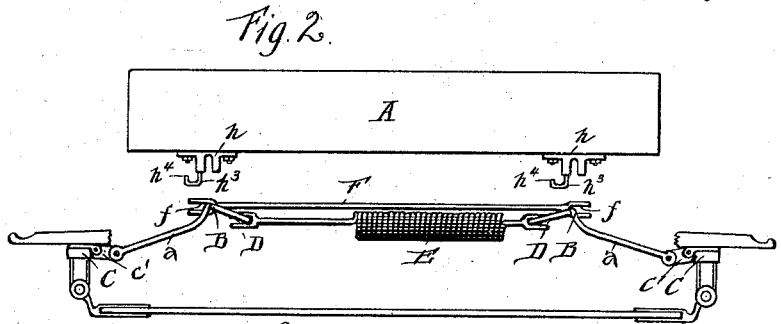
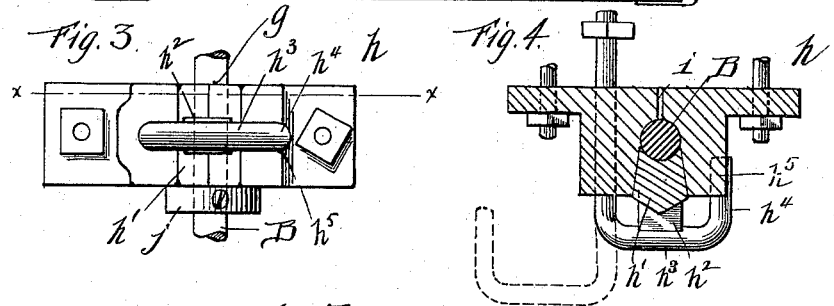
WITNESSES:
Geo. M. Anderson
Phill. Masi
INVENTOR:
A. W. Burdick
by E. W. Anderson
his ATTORNEY.

UNITED STATES PATENT OFFICE.

ARTHUR W. BURDICK, OF FRESNO, CALIFORNIA.

VEHICLE-SPRING.

SPECIFICATION forming part of Letters Patent No. 533,344, dated January 29, 1895.

Application filed August 31, 1894. Serial No. 521,808. (No model.)

*To all whom it may concern:*

Be it known that I, ARTHUR W. BURDICK, a citizen of the United States, and a resident of Fresno, in the county of Fresno and State of California, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a bottom plan of invention applied. Fig. 2 is a side elevation of same with wagon body lifted off the springs. Fig. 3 is an enlarged bottom plan of journal box and collar. Fig. 4 is a section on line $x-x$, Fig. 3. Fig. 5 is an end view of fork.

This invention has relation to certain new and useful improvements in vehicle springs, the object being to provide a simple and efficient spring support for vehicle bodies having means for preventing lateral motion of the body, and for preventing the displacement of the attachment bolts; and the invention consists in the novel construction and combination of parts all as hereinafter described and pointed out in the appended claim.

Referring to the accompanying drawings, the letter A designates the body of a vehicle to which I have shown my improved spring applied.

B, B' designate transversely extending torsional bars or levers, one of which is provided near each end of the body upon the under side thereof. Said bars or levers are each provided with side arms $a$, which are secured to the bolsters C of the running gear, or directly to the axle-trees, by means of clips $c'$, or by simple pivot connections. The central portion of each of said bars or levers is formed with cranks D, D, opposite cranks being connected by longitudinal helical springs E. Between said springs is a longitudinal bar F, having a fork $f$ at each end portion, said forks embracing respectively the portions of the bars between the cranks. At $g$, $g$ each of said bars is provided with journals which bear in boxes $h$ on the lateral portions of the body A. Owing to the wear of these journals the body would be permitted a lateral or side sliding motion accompanied by more or less rattle, and to prevent this I provide the collars $j$, which effectually prevent such wear. The boxes $h$ consist each of a grooved block bolted to the side of the body and having a removable bearing block $h'$ held in place by a key $h^2$, engaged by the bent arm of a bolt $h^3$. In order to prevent said bolt from becoming loosened by the jar of the vehicle and thus permit the body to be thrown off the spring, I bend its end portion $h^4$ into engagement with a groove or depression $h^5$ in the block $h$. An oil-hole $i$, may be provided for said bearing, said hole extending up through the body of the vehicle.

The forked ends of the springs E E, and of the bar F are preferably of the form shown in Fig. 5, having each a groove $k$ to retain lubricant.

It will be observed that the springs as above described, while effectually preventing lateral movement to the body, permit the latter a free up and down movement, making an easy riding vehicle, the springs adapting themselves to the different loads; also that the body may be readily removed and replaced upon the springs.

Having thus described my invention, what I claim as new, and desire to secure by Letters Patent, is—

The vehicle spring, comprising the torsional bails or bars B, B', loosely connected to the running gear, and having their transverse arms formed with cranks, bearings for said arms on the under side of the vehicle body, collars on said arms adjacent to said bearings for preventing lateral play, the longitudinal helical springs E connecting the opposite cranks of said arms, said springs having forked extensions for engagement with said cranks, and a rigid longitudinal bar F connecting said arms between said springs and having a fork $f$ at each end, substantially as specified.

In testimony whereof I affix my signature in presence of two witnesses.

A. W. BURDICK.

Witnesses:
 CHAS. A. CHAMBERS,
 S. H. COLE.